(12) United States Patent
Matsuo

(10) Patent No.: US 6,531,953 B1
(45) Date of Patent: Mar. 11, 2003

(54) METHOD OF CONTROLLING DETOURING IN INTEGRATED NETWORK AND COMMUNICATION DEVICE BASED ON SUCH METHOD

(75) Inventor: Shinichiro Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,912

(22) Filed: Dec. 28, 1999

(30) Foreign Application Priority Data

May 25, 1999 (JP) .......................................... 11-145527

(51) Int. Cl.[7] .............................................. H01H 67/00
(52) U.S. Cl. ....................... 340/2.23; 340/2.1; 340/2.21
(58) Field of Search ................................ 340/2.1, 2.21, 340/2.23, 825.02, 2.7, 2.8, 2.24; 370/232, 237, 352, 354, 387

(56) References Cited

U.S. PATENT DOCUMENTS 5,583,860 A * 12/1996 Iwkawa et al. ............. 370/232
5,822,605 A * 10/1998 Higuchi et al. ......... 395/800.11
6,335,930 B1 * 1/2002 Lee ............................. 370/387

FOREIGN PATENT DOCUMENTS

JP  8-223179  8/1996

* cited by examiner

*Primary Examiner*—Van Trieu
(74) *Attorney, Agent, or Firm*—Katten Muchin Zavis Rosenman

(57) ABSTRACT

A method of controlling detouring in an integrated network which includes communication devices includes the steps of registering routes at a communication device connected to terminal devices of respective media types such that the routes include a main route and a detour route with respect to each of the media types, and establishing a connection along the detour route registered for a media type upon finding unavailability of the main route registered for the media type when a call of the media type is requested from one of the terminal devices.

12 Claims, 16 Drawing Sheets

FIG. 8

| MEDIA TYPE | MAIN ROUTE | DETOUR ROUTE | SETTING |
|---|---|---|---|
| FR | PRIMARY RELAY LINE L1 →PRIMARY RELAY LINE L3 | PRIMARY RELAY LINE L2 →PRIMARY RELAY LINE L4 | ✕ |
| ATM | PRIMARY RELAY LINE L1 →PRIMARY RELAY LINE L3 | PRIMARY RELAY LINE L2 →PRIMARY RELAY LINE L4 | |
| CES | PRIMARY RELAY LINE L1 →PRIMARY RELAY LINE L3 | PRIMARY RELAY LINE L1 →EXTERNAL LINE L5 →EXTERNAL LINE L6 | OFF |
| | | PRIMARY RELAY LINE L2 →PRIMARY RELAY LINE L4 | ON |
| TDM | PRIMARY RELAY LINE L1 →PRIMARY RELAY LINE L3 | PRIMARY RELAY LINE L1 →EXTERNAL LINE L5 →EXTERNAL LINE L6 | OFF |
| | | PRIMARY RELAY LINE L2 →PRIMARY RELAY LINE L4 | ON |

FIG. 11

| TERMINAL-ATTRIBUTE INFORMATION | MAIN ROUTE | DETOUR ROUTE | SETTING |
|---|---|---|---|
| PRIORITY LEVEL A (FR, ATM) | PRIMARY RELAY LINE L1 →PRIMARY RELAY LINE L3 | PRIMARY RELAY LINE L2 →PRIMARY RELAY LINE L4 | |
| PRIORITY LEVEL B (CES, TDM) | PRIMARY RELAY LINE L1 →PRIMARY RELAY LINE L3 | PRIMARY RELAY LINE L1 →EXTERNAL LINE L5→EXTERNAL LINE L6 | OFF |
| | | PRIMARY RELAY LINE L2 →PRIMARY RELAY LINE L4 | ON |

FIG. 13

| MEDIA TYPE | TIMEFRAME | MAIN ROUTE | DETOUR ROUTE |
|---|---|---|---|
| CES | T1 | PRIMARY RELAY LINE L1 →PRIMARY RELAY LINE L3 | PRIMARY RELAY LINE L2 →PRIMARY RELAY LINE L4 |
| | T2 | PRIMARY RELAY LINE L1 →PRIMARY RELAY LINE L3 | PRIMARY RELAY LINE L1 →EXTERNAL LINE L5→EXTERNAL LINE L6 |
| | | | PRIMARY RELAY LINE L2 →PRIMARY RELAY LINE L4 |
| | ... | ... | ... |
| ... | | | |

FIG. 15

| MEDIA TYPE | NUMBER OF CALLS | MAIN ROUTE | DETOUR ROUTE |
|---|---|---|---|
| CES | <20calls | PRIMARY RELAY LINE L1 —PRIMARY RELAY LINE L3 | PRIMARY RELAY LINE L2 —PRIMARY RELAY LINE L4 |
| | ≥ 20 calls | PRIMARY RELAY LINE L1 —PRIMARY RELAY LINE L3 | PRIMARY RELAY LINE L1 —EXTERNAL LINE L5—EXTERNAL LINE L6 |
| | | | PRIMARY RELAY LINE L2 —PRIMARY RELAY LINE L4 |

METHOD OF CONTROLLING DETOURING IN INTEGRATED NETWORK AND COMMUNICATION DEVICE BASED ON SUCH METHOD

BACKGROUND OF THE INVENTION

1. Field of the Invention

The present invention generally relates to a method of controlling detouring in an integrated network and a communication device based on such a method, and particularly relates to such a method and a communication device where the integrated network is comprised of an ATM (asynchronous transfer mode) network that integrates various media and communications.

2. Description of the Related Art

Detour control in an ATM integrated network is defined by PNNI (private network-to-network interface) protocols, which establish an appropriate detour route when node failure, communication-path failure, and/or communication-path congestion make communication impossible along an original route.

At a port having the PNNI protocols assigned thereto, metric information is defined on a service-category-wise bases so as to be reported to other nodes, such metric information including control weights, cell-transfer delays, cell-delay fluctuations, etc. Such information is reported by using PTSPs (PNNI topology state packets) to other nodes, where GCAC (generic connection admission control) is performed based on the received information. Here, the GCAC selects a route.

Technological development and market progress of the ATM technology have led to an emergence of an ATM integrated network in which conventional low-speed data lines, high-speed data lines, frame relay lines, audio communication lines, etc., are connected via ATM lines. Such an ATM integrated network includes various media devices, and transfers data between terminal devices.

In the following, a detour function will be described.

FIG. 1 is an illustrative drawing for explaining a detour function in an ATM network.

FIG. 1 shows a situation where a route RT1 and a route RT2 are functioning properly. When a CES (circuit emulation service) terminal CES1 that renders a service for providing a dedicated-line like path in the ATM network transfers data to a CES terminal CES3, the data travels along a route from CES1, AWN(ATM WAN node)-1, AWN-2, AWN-3, to CES3. Also, when an FR (frame relay) terminal FR1 that achieves high-speed data transfer by using simplified protocols transfers data to an FR terminal FR3, the data travels along a route from FR1, AWN-1, AWN-2, AWN-3, to FR3.

FIG. 2 is an illustrative drawing showing a situation where a failure occurs in the ATM network of FIG. 1.

When an ATM line between AWN-2 and AWN-3 suffers a failure as shown in FIG. 2, the data from CES1 to CES3 cannot take the route RT1 shown in FIG. 1. In response, a route is changed to a route RT3 which extends from CES1, AWN-1, AWN-2, a public network, AWN-3, to CES3, and the data travels along the route RT3. By the same token, the data from FR1 to FR3 cannot take the route RT2 shown in FIG. 1. In response, a route is changed to a route RT4 which extends from FR1, AWN-1, AWN-2, the public network, AWN-3, to FR3, and the data travels along the route RT4.

Usage of the network varies depending on a type of media. For example, even when a given frequency band of the public network is set aside for use by the FR terminal FR1, the FR terminal may not be using this frequency band at a given point of time.

FIG. 3 is an illustrative drawing for showing an alternative route in the ATM network of FIG. 1.

In FIG. 3, a route RT5 connecting between AWN-1 and AWN-3 via AWN-4 is functioning normally and available. In this case, AWN-1 should select the route RT5 rather than the route RT4 of FIG. 2 since the route RT5 provides a communication path within a private network whereas the route 4 incurs charges for use of the public network. When a failure occurs on the ATM line between AWN-2 and AWN-3, however, a route is changed to the route RT4 as a matter of course in the conventional scheme, offering no other option to select an optimum detour route.

Accordingly, there is a need for a method of controlling detouring in an integrated network which allows a detour route to be selected according to the type of media, and, also, there is a need for a communication device based on such a method.

SUMMARY OF THE INVENTION

Accordingly, it is a general object of the present invention to provide a scheme for controlling detouring in an integrated network such as to achieve the needs described above.

It is another and more specific object of the present invention to provide a method for controlling detouring in an integrated circuit which allows a detour route to be selected according to the type of media.

In order to achieve the above objects according to the present invention, a method of controlling detouring in an integrated network which includes communication devices includes steps of registering routes at a communication device connected to terminal devices of respective media types such that the routes include a main route and a detour route with respect to each of the media types, and establishing a connection along the detour route registered for a media type upon finding unavailability of the main route registered for the media type when a call of the media type is requested from one of the terminal devices.

It is yet another object of the present invention to provide a communication device which can select a detour route according to the type of media.

In order to achieve the above object according to the present invention, a device for communication in an integrated network, connected to terminal devices of respective media types, includes a detour-information-storage unit which stores routes registered therein such that the routes include a main route and a detour route with respect to each of the media types, and a detour-control unit which establishes a connection along the detour route registered for a media type upon finding unavailability of the main route registered for the media type when a call of the media type is requested from one of the terminal devices.

Other objects and further features of the present invention will be apparent from the following detailed description when read in conjunction with the accompanying drawings.

BRIEF DESCRIPTION OF THE DRAWINGS

FIG. 8 is an illustrative drawing showing an embodiment of a detour-information table stored in each of an IISP-detour-information-storage unit and a PNNI-detour-information-storage unit;

FIG. 11 is an illustrative drawing showing a second embodiment of a detour-information table stored in each of the IISP-detour-information-storage unit and the PNNI-detour-information-storage unit;

FIG. 13 is an illustrative drawing showing a third embodiment of a detour-information table stored in each of the IISP-detour-information-storage unit and the PNNI-detour-information-storage unit;

FIG. 15 is an illustrative drawing showing a fourth embodiment of a detour-information table stored in each of the IISP-detour-information-storage unit and the PNNI-detour-information-storage unit.

DESCRIPTION OF THE PREFERRED EMBODIMENTS

In the following, embodiments of the present invention will be described with reference to the accompanying drawings.

Figure 1:
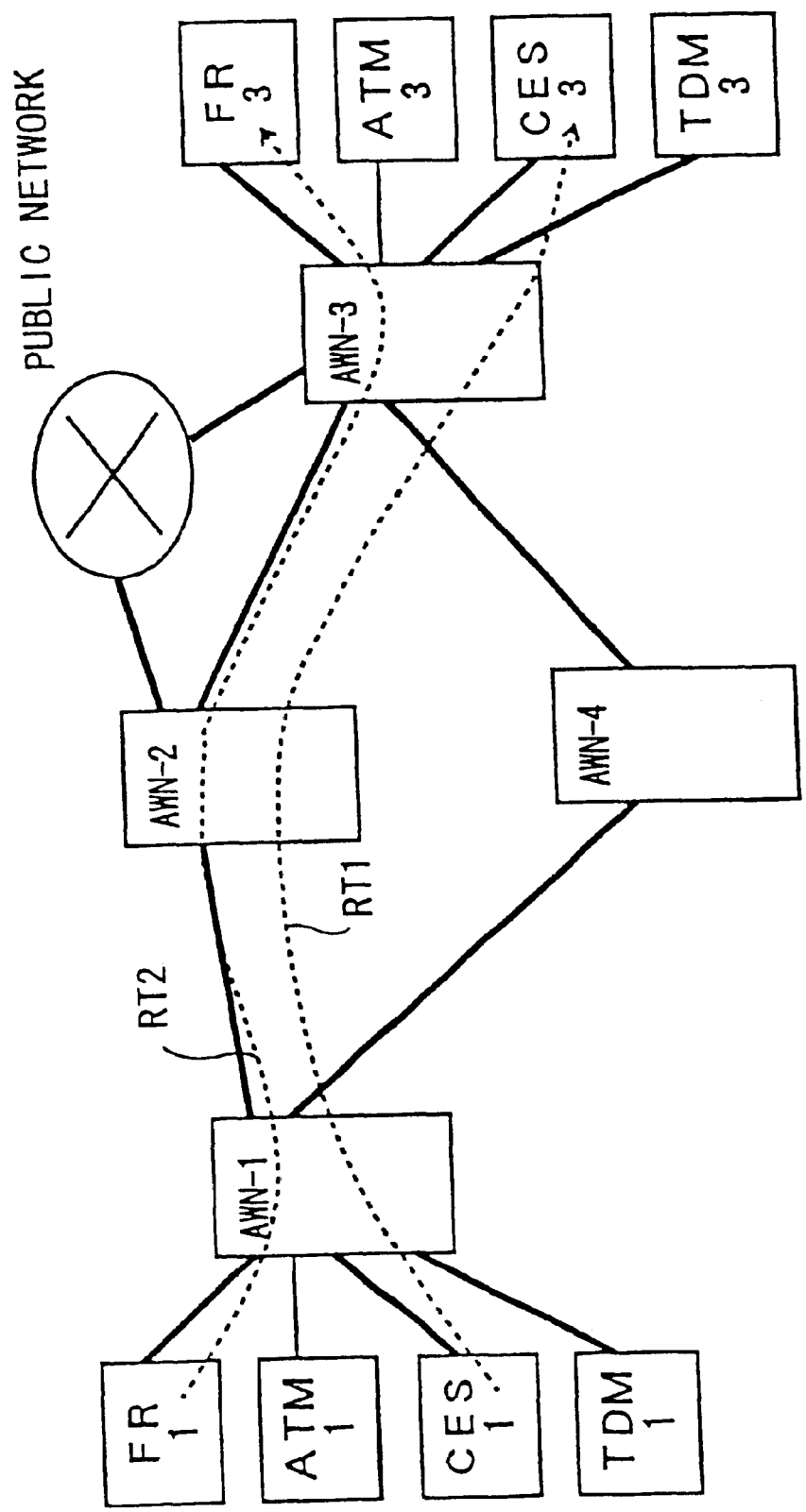
FIG. 1 is an illustrative drawing for explaining a detour function in an ATM network.
Figure 2:
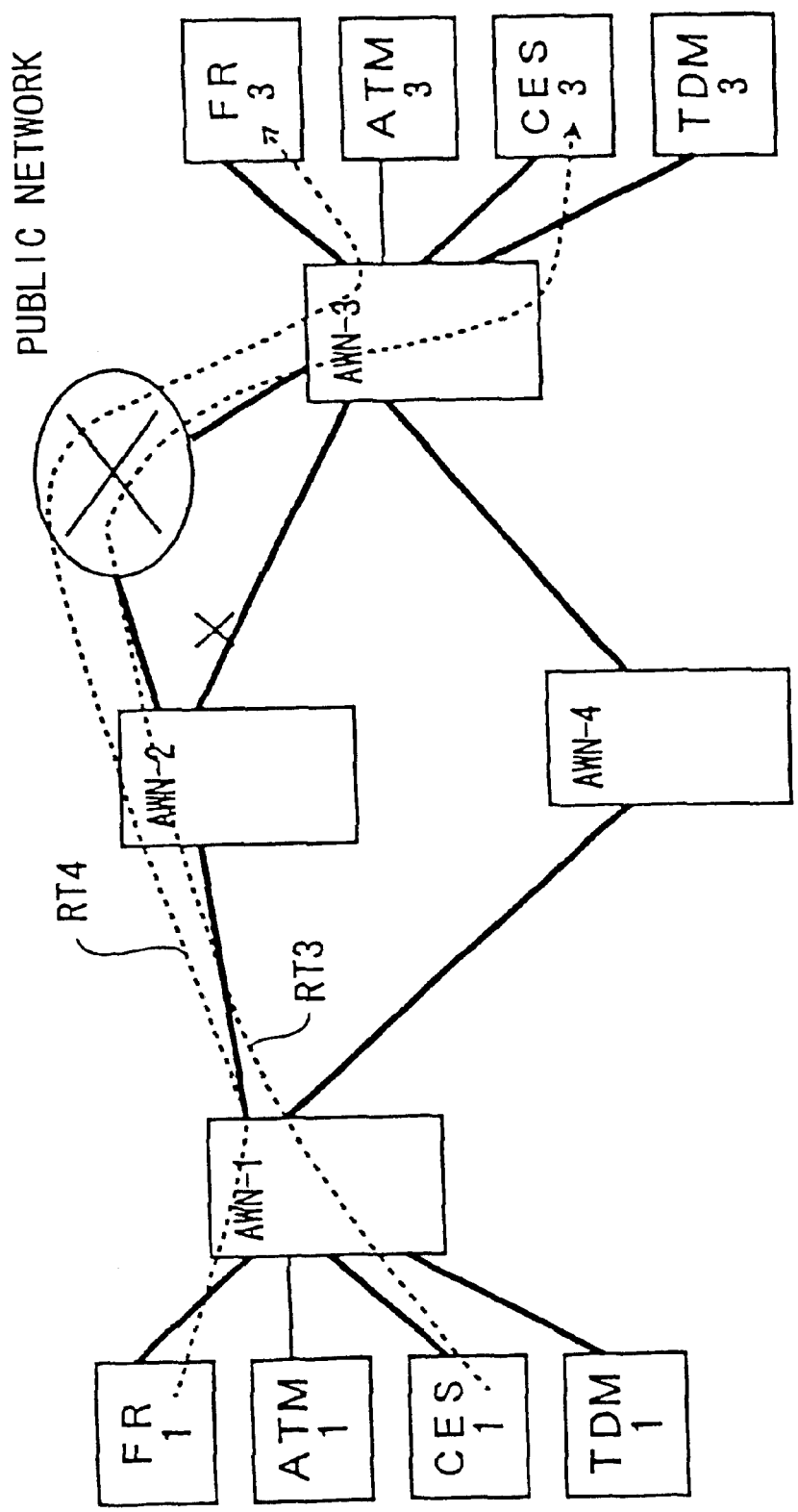
FIG. 2 is an illustrative drawing showing a situation where a failure occurs in the ATM network of FIG. 1.
Figure 3:
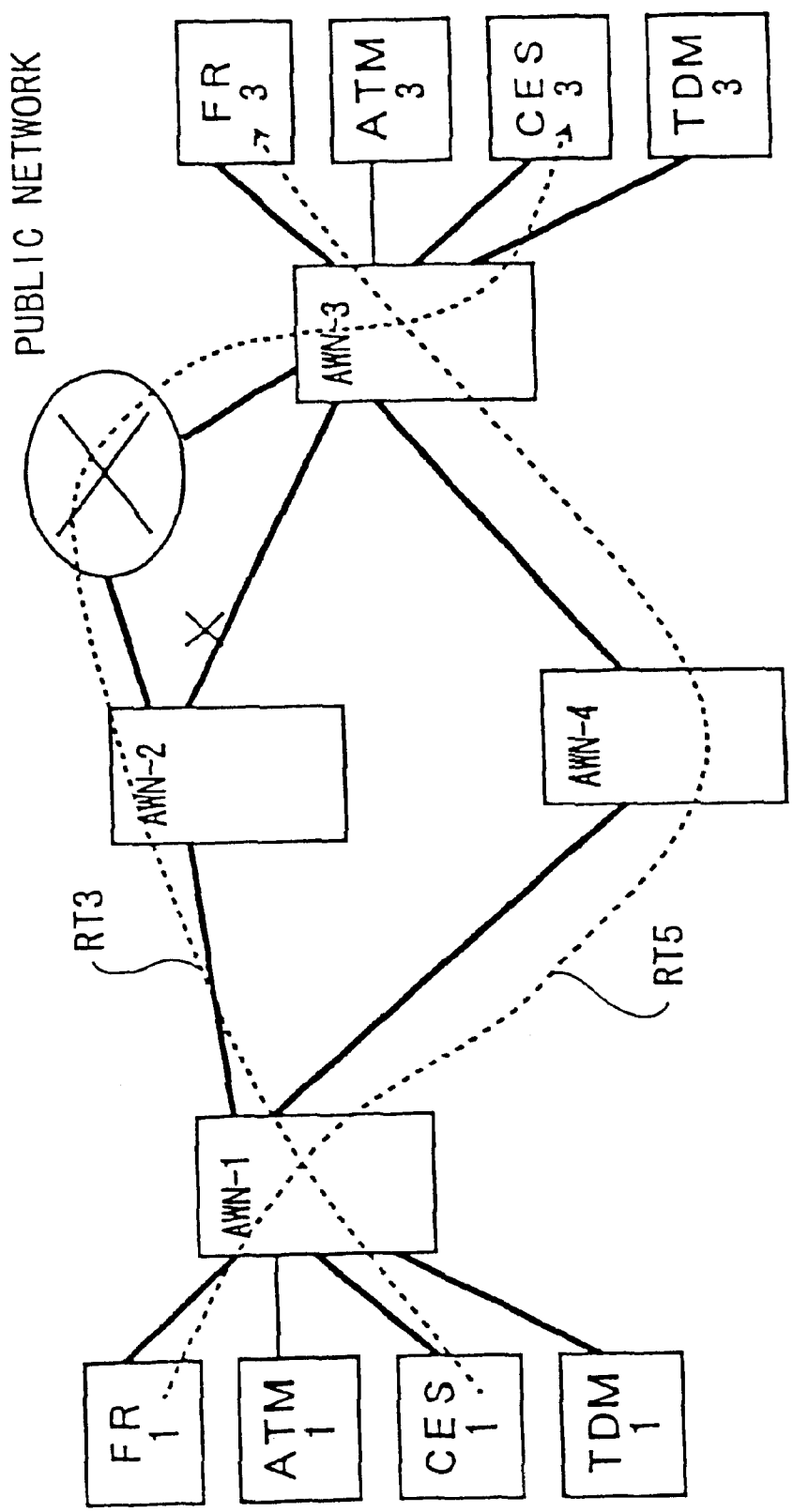
FIG. 3 is an illustrative drawing for showing an alternative route in the ATM network of FIG. 1.
Figure 4:
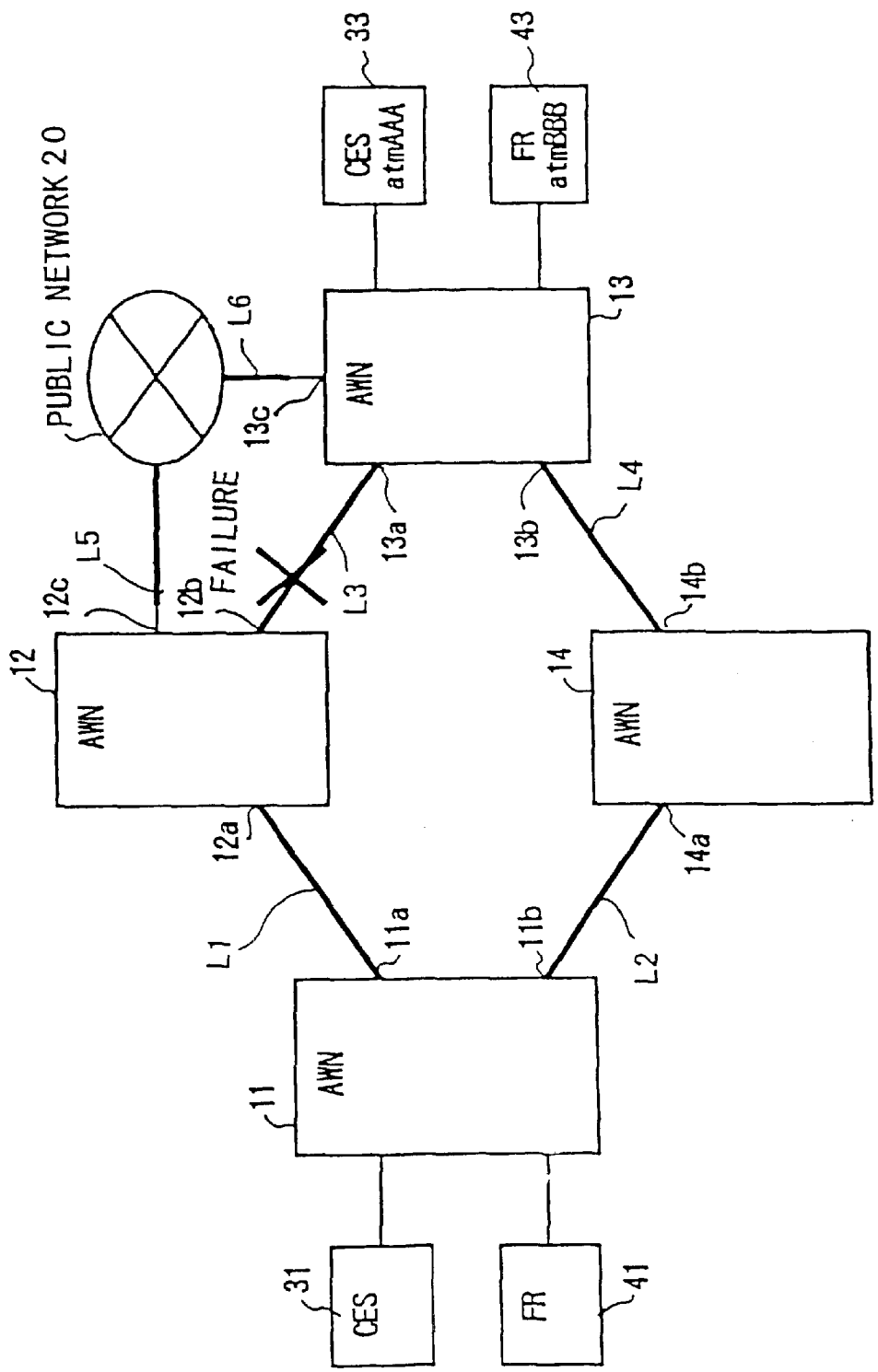
FIG. 4 is an illustrative drawing showing an embodiment of a network system according to the present invention.

FIG. 4 is an illustrative drawing showing an embodiment of a network system according to the present invention.

The network system of FIG. 4 includes communication devices 11 through 14, each of which is an AWN (ATM WAN node). The network system further includes primary relay lines L1 through L4, external lines L5 and L6, and a public network 20 connected between the communication devices 12 and 13 by using the external lines L5 and L6. Here, the communication devices 11 through 14 and the primary relay lines L1 through L4 together make up an ATM integrated network.

The primary relay line L1 connects between a relay-line port 11a of the communication device 11 and a relay-line port 12a of the communication device 12. The primary relay line L2 connects between a relay-line port 11b of the communication device 11 and a relay-line port 14a of the communication device 14. The primary relay line L3 connects between a relay-line port 12b of the communication device 12 and a relay-line port 13a of the communication device 13. The primary relay line L4 connects between a relay-line port 14b of the communication device 14 and a relay-line port 13b of the communication device 13.

The communication device 12 has an external-line port 12c connected to the external line L5 leading to the public network 20, and the communication device 13 has an external-line port 13c connected to the external line L6 leading to the public network 20. By dialing a predetermined number (e.g., 044-777-111), the communication device 12 can reach the communication device 13.

The communication device 11 is connected to a CES terminal 31, which provides a communication based on circuit emulation to achieve low-speed/high-speed data transfer, and provides a path that serves like a dedicated line in the ATM network. The communication device 13 is connected to a CES terminal 33 that has an atm address atmAAA.

The communication device 11 is also connected to an FR terminal 41, which offers frame-relay communications via simplified protocols so as to achieve high-speed data transfer. Further, the communication device 13 is connected to an FR terminal 43 having an atm address atmBBB.

In the following, configurations of the communication devices 11 through 14 will be described. In should be noted that the communication devices 11 through 14 have an almost identical configuration.

Figure 5:
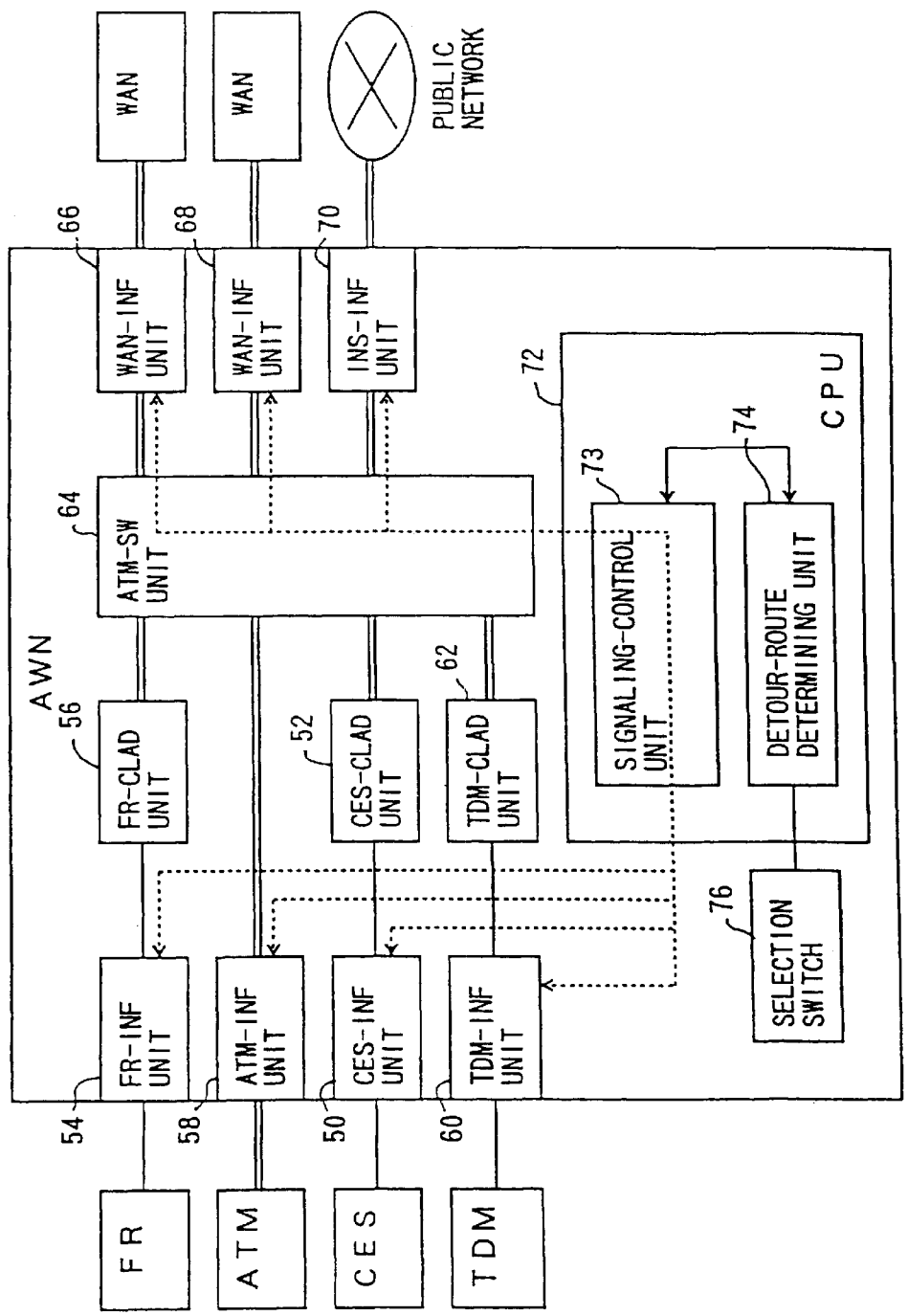
FIG. 5 is a block diagram of a communication device.

FIG. 5 is a block diagram of a communication device.

The communication device of FIG. 5 includes a CES-INF unit 50 connected to a CES terminal, a CES-CLAD unit 52 connected to the CES-INF unit 50, an FR-INF unit 54 connected to an FR terminal, and an FR-CLAD unit 56 connected to the FR-INF unit 54, an ATM-INF unit 58 connected to an ATM terminal, a TDM-INF unit 60 connected to a TDM terminal, a TDM-CLAD unit 62 connected to the TDM-INF unit 60, WAN-INF units 66 and 68 connected to respective WANs, and an INS-INF unit 70 connected to a public network. The communication device further includes an ATM-SW unit 64 and a CPU 72. The ATM-SW unit 64 is connected to the CES-CLAD unit 52, the FR-CLAD unit 56, the ATM-INF unit 58, the TDM-CLAD unit 62, the WAN-INF unit 66, the WAN-INF unit 68, and the INS-INF unit 70. The CPU 72 is connected to the CES-INF unit 50, the FR-INF unit 54, the ATM-INF unit 58, the TDM-INF unit 60, the WAN-INF unit 66, the WAN-INF unit 68, the INS-INF unit 70, and the ATM-SW unit 64.

The CES-INF unit 50 is equipped with an interface circuit for low-speed/high-speed data communication. Physical interface for low-speed/high-speed data communication is terminated at the CES-INF unit 50. The CES-INF unit 50 is connected to a signaling-control unit 73 of the CPU 72 via control lines. The CES-CLAD unit 52 converts communication data into ATM cells when receiving the communication data from the CES terminal, and extracts communication data from received ATM cells to supply the communication data to the CES terminal.

The FR-INF unit 54 is equipped with an interface circuit for frame-relay communication. Physical interface for frame-relay communication is terminated at the FR-INF unit 54. The FR-INF unit 54 is connected to the signaling-control unit 73 of the CPU 72 via control lines. The FR-CLAD unit 56 converts communication data into cells when receiving the communication data from the FR terminal, and extracts communication data from received cells to supply the communication data to the FR terminal.

The ATM-SW unit 64 exchanges cells, and, also, terminates signaling of the ATM communication lines. The ATM- SW unit 64 is connected to the signaling-control unit 73 of the CPU 72 via control lines. The WAN-INF units 66 and 68 are provided with an interface for ATM lines, and serve as WAN-line devices. The INS-INF unit 70 is equipped with an interface for INS lines, and serves as a WAN-line device for the public network.

The CPU 72 includes the signaling-control unit 73 and a detour-route determining unit 74. These units are used in conjunction with execution of programs by the CPU 72. The signaling-control unit 73 attends to signaling control of the ATM lines, and, also, control communications between terminal devices. The CPU 72 is connected to a selection switch 76.

Figure 6:
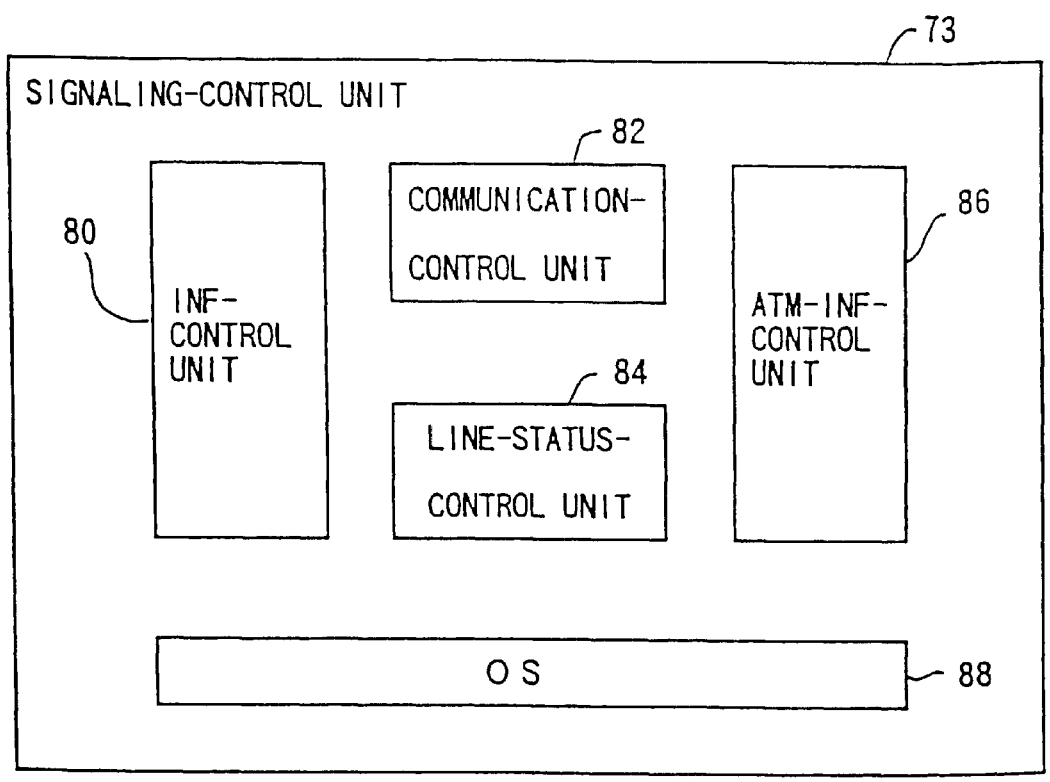
FIG. 6 is a function block diagram of a signaling-control unit.

FIG. 6 is a function block diagram of the signaling-control unit 73.

In FIG. 6, the signaling-control unit 73 includes an INF-control unit 80, a communication-control unit 82, a line-status-control unit 84, a ATM-INF-control unit 86, and an OS (operating system) 88. The INF-control unit 80 is connected to the CES-INF unit 50, the FR-INF unit 54, the ATM-INF unit 58, and the TDM-INF unit 60. The ATM-INF-control unit 86 is connected to the WAN-INF unit 66, the WAN-INF unit 68, and the INS-INF unit 70. The OS 88 controls the other units of the signaling-control unit 73.

The detour-route determining unit 74 stores detour information about the ATM network, and selects a detour route that satisfies predetermined selection criteria.

Figure 7:
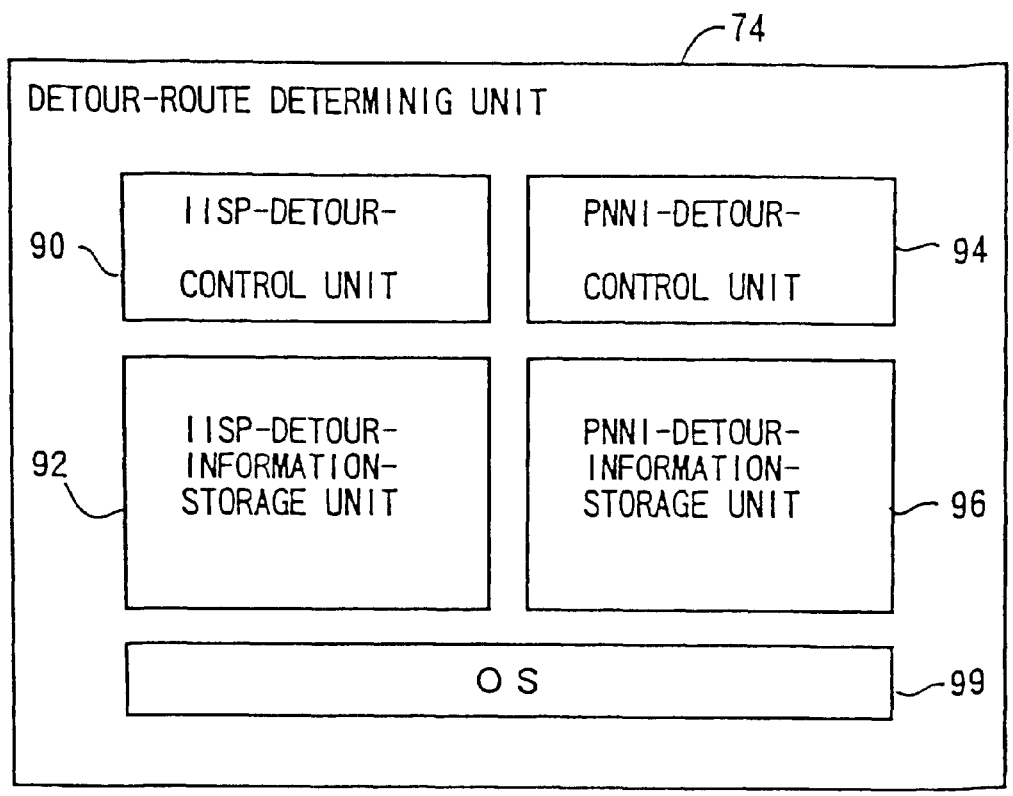
FIG. 7 is a function block diagram of a detour-route determining unit.

FIG. 7 is a function block diagram of the detour-route determining unit 74.

In FIG. 7, the detour-route determining unit 74 includes an IISP-detour-control unit 90, an IIS-Idetour-information-storage unit 92, a PNNI-detour-control unit 94, a PNNI-detour-information-storage unit 96, and an OS (operating system) 98. The IISP-detour-information-storage unit 92 stores detour information with respect to each media type relating to IISP. The PNNI-detour-information-storage unit 96 stores detour information with respect to each media type relating to PNNI.

The PNNI-detour control is defined by the PNNI (private network-to-network interface) protocols. When the primary relay line L3 suffers a failure between AWN 12 and AWN 13 in FIG. 4, for example, the communication device (AWN) 12 informs the communication device (AWN) 11 of this failure.

The IISP-detour control is defined by the IISP protocols. When the primary relay line L3 suffers a failure between AWN 12 and AWN 13 in FIG. 4, for example, the communication device (AWN) 11 detects this failure from severance of communication between AWN 11 and AWN 13.

Each of the IISP-detour-information-storage unit 92 and the PNNI-detour-information-storage unit 96 is provided with a detour-information table that stores detour information with respect to each media type.

FIG. 8 is an illustrative drawing showing an embodiment of a detour-information table stored in each of the IISP-detour-information-storage unit 92 and the PNNI-detour-information-storage unit 96.

A table such as the one shown in FIG. 8 is provided for each communication device. The table of FIG. 8 defines a main route and a detour route to connect between the communication devices 11 and 13.

With respect to the FR media type, as shown in FIG. 8, the main route is comprised of the primary relay lines L1 and L3, and the detour route is comprised of the primary relay lines L2 and L4. This is the same for the ATM media type.

For the CES media type, the main route is comprised of the primary relay lines L1 and L3, and detour route is comprised of the primary relay line L1 and the external lines L5 and L6 when the selection switch 76 is in an off position. When the selection switch 76 is on, however, the detour route is comprised of the primary relay lines L2 and L4. This is the same for the TDM media type as shown in FIG. 8.

In what follows, operation of the network system of FIG. 4 will be described. This description will be given with regard to an example situation where the CES terminal 31 and the CES terminal 33 are connected via a soft PVC (permanent virtual circuit) connection. Namely, the CES terminals 31 and 33 are connected to the communication devices 11 and 13, respectively, via a PVC connection, and an SVC (switched virtual circuit) connection provides communication between the communication devices 11 and 13. Further, it is assumed that the FR terminals 41 and 43 are also connected via a soft PVC connection.

When the CES terminals 31 and 33 need to be connected through a soft PVC, structure data is registered such that a soft PVC connects between the CES terminal 31 and the CES-INF unit 50 of the communication device 11 and between the CES terminal 33 and the CES-INF unit 50 of the communication device 13. Further, SVC-call setting information is registered in the communication device 11 such that the WAN-INF unit 66 of the communication device 11 and the WAN-INF unit 66 of the communication device 13 are connected via an SVC link.

As a result, the communication devices 11 through 13 can perform a call setting procedure according to the ATM forum UNI 4.0, for example. Thus, the signaling-control unit of each communication device controls the signaling of B-ISDN, e.g., SETUP/CONNECT/DISC and the like, thereby establishing a soft PVC link from the CES terminal 31, AWN 11, AWN 12, AWN 13, to the CES terminal 33. In detail, paths between the CES terminal 31 and AWN 11 and between AWN 13 and the CES terminal 33 are connected via PVC, and paths from AWN 11 to AWN 12 and from AWN 12 to AWN 13 are connected via SVC. In the same fashion, the FR terminals 41 and 43 are connected via a soft SVC link.

In order to provide a basis for the ATM forum PNNI 1.0 (PNNI protocols), relay-line ports are assigned to or registered at each communication device as PNNI ports used for the media type relating to CES terminals. Namely, according to the detour-information table of FIG. 8, the relay-line ports 11a and 11b are assigned to the communication device 11, and the relay-line ports 12a and 12b are assigned to the communication device 12. Further, the relay-line ports 13a and 13b are assigned to the communication device 13, and the relay-line ports 14a and 14b are assigned to the communication device 14. Also, the external-line ports 12c and 13c are assigned to the communication devices 12 and 13, respectively. As a result, a network for the CES-terminal-media type is comprised of the primary relay lines L1 through L4 and the external lines L5 and L6.

Moreover, relay-line ports are assigned to or registered at each communication device as PNNI ports used for the media type relating to FR terminals. Namely, according to the detour-information table of FIG. 8, the relay-line ports 11a and 11b are assigned to the communication device 11, and the relay-line ports 12a and 12b are assigned to the communication device 12. Further, the relay-line ports 13a and 13b are assigned to the communication device 13, and the relay-line ports 14a and 14b are assigned to the communication device 14. As a result, a network for the FR-terminal-media type is comprised of the primary relay lines L1 through L4.

When there is a failure on the primary relay line L3, the communication device 12 sends a DISC message to the communication device 11 for the purpose of releasing the SVC call. Based on the received DISC message, the communication device 11 determines a detour route to achieve a source routing. Since the communication device 11 can distinguish a media type of a source terminal device, the communication device 11 will decide respective connection routes for the CES-terminal-media type and the FR-terminal-media type according to the detour-information table of FIG. 8. That is, the route from AWN 11, the primary relay line L1, AWN 12, the external lines L5 and L6 (public network 20), to AWN 13 is selected for the CES-terminal-media type, and the route from AWN 11, the primary relay line L2, AWN 14, the primary relay line L4, to AWN 13 is selected for the FR-terminal-media type.

Figure 9:
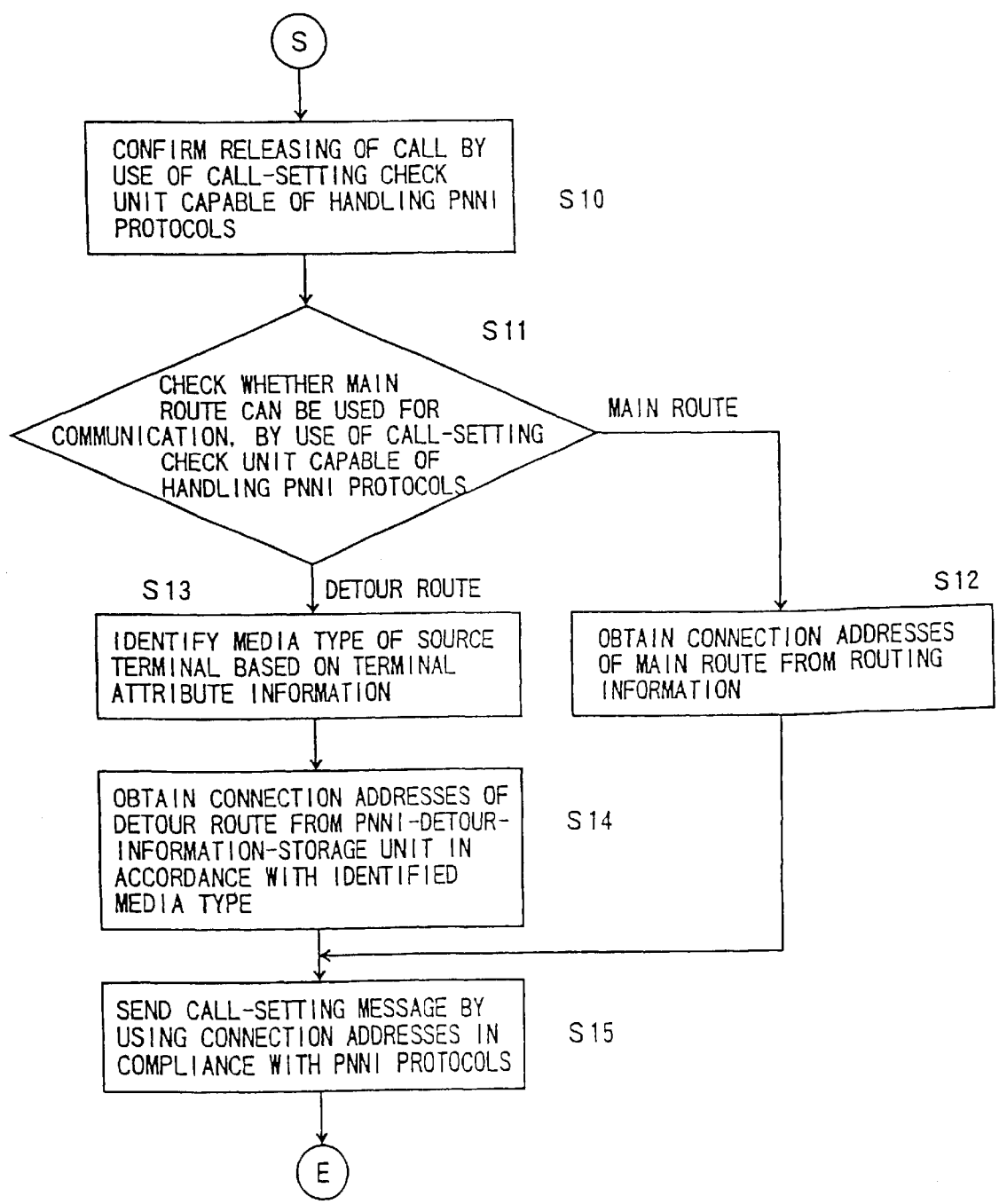
FIG. 9 is a flowchart of a first embodiment of a process performed by a communication device connected to a source terminal device when a failure occurs during use of PNNI protocols.

FIG. 9 is a flowchart of a first embodiment of a process performed by a communication device connected to a source terminal device when a failure occurs during use of the PNNI protocols.

At a step S10, the line-status-control unit 84 of the signaling-control unit 73 confirms releasing of the call. Here, the line-status-control unit 84 serves as a call-setting check unit capable of handling the PNNI protocols.

At a step S11, the communication-control unit 82 of the signaling-control unit 73 checks whether the main route can be used for communication. Here, the communication-control unit 82 serves as a call-setting check unit capable of handling the PNNI protocols. If the main route is usable, the procedure goes to a step S12.

At the step S12, connection addresses of the main route are obtained from the routing information of FIG. 8. After the step S12, the procedure goes to a step S15.

At a step S13, which is performed if the step S11 finds that the main route is not usable, a media type of the source terminal is identified based on the terminal attribute information, and, also, an on/off state of the selection switch 76 is checked.

At a step S14, the PNNI-detour-control unit 94 of the detour-route determining unit 74 obtains connection addresses of the detour route from the PNNI-detour-information-storage unit 96 as shown in FIG. 8 in accordance with the identified media type and the current on/off status of the selection switch 76.

At a step S15, the PNNI-detour-control unit 94 of the detour-route determining unit 74 sends a call-setting message by using the connection addresses in compliance with the PNNI protocols. This ends the procedure.

Figure 10:
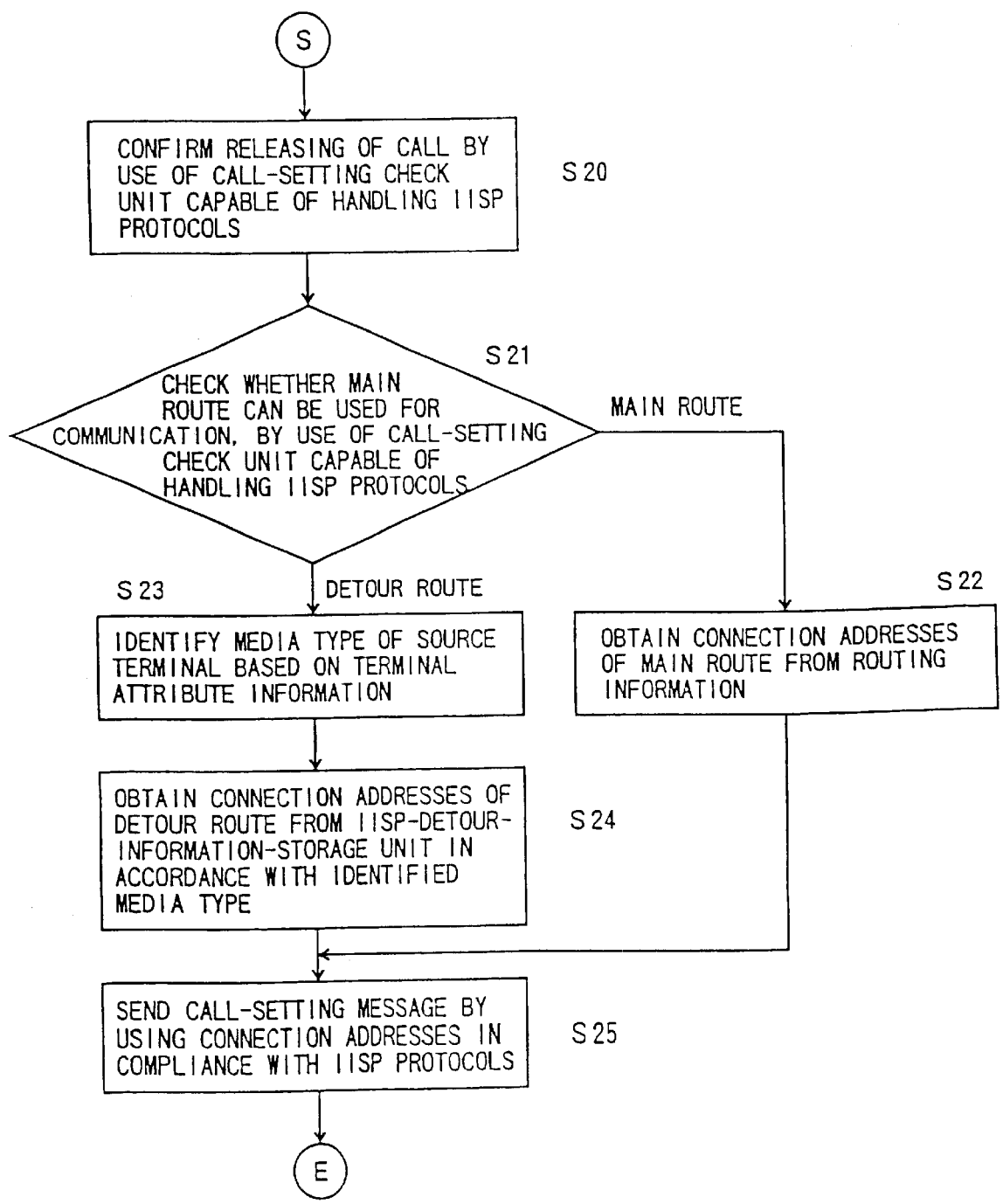
FIG. 10 is a flowchart of a second embodiment of a process performed by a communication device connected to a source terminal device when a failure occurs during use of IISP protocols.

FIG. 10 is a flowchart of a second embodiment of a process performed by a communication device connected to a source terminal device when a failure occurs during use of the IISP protocols.

At a step S20, the line-status-control unit 84 of the signaling-control unit 73 confirms releasing of the call. Here, the line-status-control unit 84 serves as a call-setting check unit capable of handling the IISP protocols.

At a step S21, the communication-control unit 82 of the signaling-control unit 73 checks whether the main route can be used for communication. Here, the communication-control unit 82 serves as a call-setting check unit capable of handling the IISP protocols. If the main route is usable, the procedure goes to a step S22.

At the step S22, connection addresses of the main route are obtained from the routing information of FIG. 8. After the step S22, the procedure goes to a step S25.

At a step S23, which is performed if the step S21 finds that the main route is not usable, a media type of the source terminal is identified based on the terminal attribute information, and, also, an on/off state of the selection switch 76 is checked.

At a step S24, the IISP-detour-control unit 90 of the detour-route determining unit 74 obtains connection addresses of the detour route from the IISP-detour-information-storage unit 92 as shown in FIG. 8 in accordance with the identified media type and the current on/off status of the selection switch 76.

At a step S25, the IISP-detour-control unit 90 of the detour-route determining unit 74 sends a call-setting message by using the connection addresses in compliance with the IISP protocols. This ends the procedure.

In the manner as described above, when no connection can be established along the main route for a terminal device, a detour route is selected in accordance with the media type of the terminal device and the selection condition set by the selection switch.

FIG. 11 is an illustrative drawing showing a second embodiment of a detour-information table stored in each of the IISP-detour-information-storage unit 92 and the PNNI-detour-information-storage unit 96.

In FIG. 11, terminal-attribute information of the FR terminal and the ATM terminal is provided with priority A. For these terminals, the main route is comprised of the primary relay lines L1 and L3, and the detour route is comprised of the primary relay lines L2 through L4.

Further, terminal-attribute information of the CES terminal and the TDM terminal is provided with priority B. For these terminals, the main route is comprised of the primary relay lines L1 and L3. The detour route is comprised of the primary relay lines L1 and the external lines L5 and L6 when the selection switch 76 is off, and is comprised of the primary relay lines L2 and L4 when the selection switch 76 is on.

Figure 12:
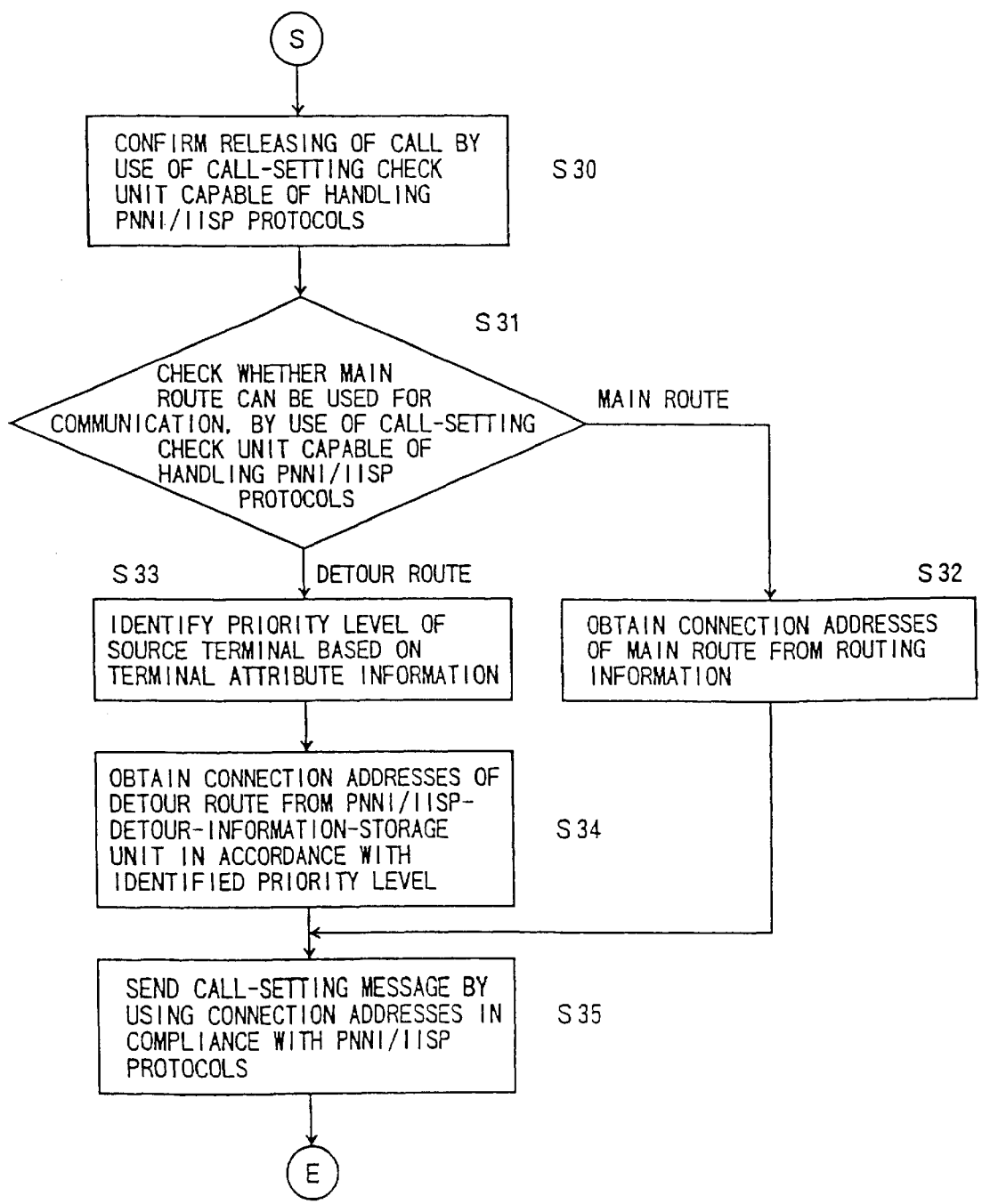
FIG. 12 is a flowchart of a third embodiment of a process performed by a communication device connected to a source terminal device when a failure occurs.

FIG. 12 is a flowchart of a third embodiment of a process performed by a communication device connected to a source terminal device when a failure occurs.

At a step S30, the line-status-control unit 84 of the signaling-control unit 73 confirms releasing of the call. Here, the line-status-control unit 84 serves as a call-setting check unit capable of handling he PNNI/IISP protocols.

At a step S31, the communication-control unit 82 of the signaling-control unit 73 checks whether the main route can be used for communication. Here, the communication-control unit 82 serves as a call-setting check unit capable of handling the PNNI/IISP protocols. If the main route is usable, the procedure goes to a step S32.

At the step S32, connection addresses of the main route are obtained from the routing information of FIG. 11. After the step S32, the procedure goes to a step S35.

At a step S33, which is performed if the step S31 finds that the main route is not usable, a priority level of the source terminal is identified from the terminal attribute information, and, also, an on/off state of the selection switch 76 is checked.

At a step S34, the IISP-detour-control unit 90 or the PNNI-detour-control unit 94 of the detour-route determining unit 74 obtains connection addresses of the detour route from the IISP-detour-information-storage unit 92 or the PNNI-detour-information-storage unit 96 as shown in FIG. 11 in accordance with the identified priority level and the current on/off status of the selection switch 76.

At a step S35, the IISP-detour-control unit 90 or the PNNI-detour-control unit 94 of the detour-route determining unit 74 sends a call-setting message by using the connection addresses in compliance with the IISP/PNNI protocols. This ends the procedure.

In the manner described above, when a main route cannot be used for a terminal device, a detour route is selected according to a priority level of the terminal device and the selection condition set by the selection switch.

FIG. 13 is an illustrative drawing showing a third embodiment of a detour-information table stored in each of the IISP-detour-information-storage unit 92 and the PNNI-detour-information-storage unit 96.

In FIG. 13, the media type of the CES terminal has a main route that is comprised of the primary relay lines L1 and L3. A detour route of this media type is comprised of the primary relay line L1 and the external lines L5 and L6 during a time period from 9:00 to 17:00, for example, and is comprised of the primary relay lines L2 and L4 during time periods from 0:00 to 9:00 and from 17:00 to 24:00, for example. Other media types such as FR, ATM, and TDM are also provided with a main route and a detour route that may differ depending on timeframes.

Figure 14:
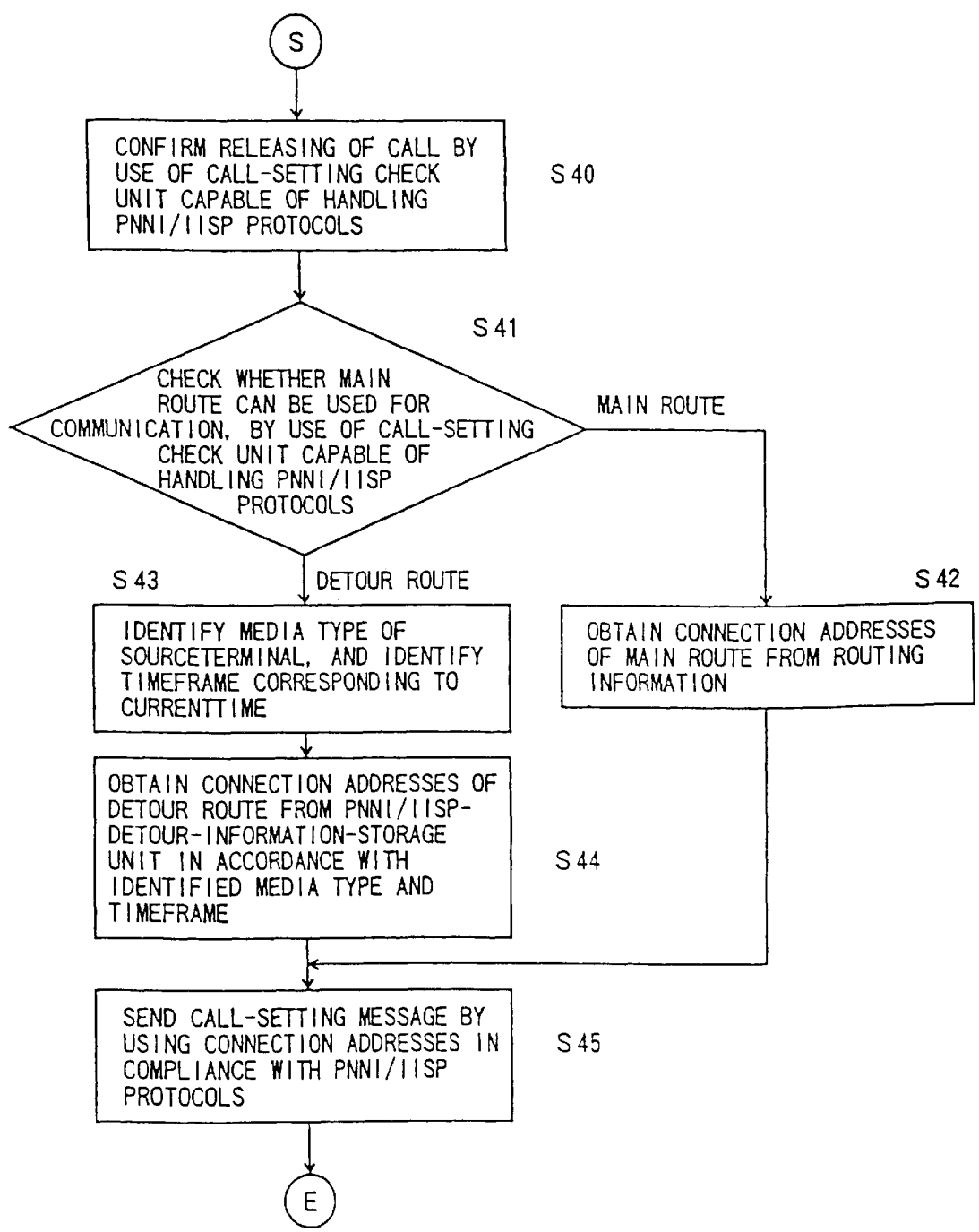
FIG. 14 is a flowchart of a fourth embodiment of a process performed by a communication device connected to a source terminal device when a failure occurs.

FIG. 14 is a flowchart of a fourth embodiment of a process performed by a communication device connected to a source terminal device when a failure occurs.

At a step S40, the line-status-control unit 84 of the signaling-control unit 73 confirms releasing of the call. Here, the line-status-control unit 84 serves as a call-setting check unit capable of handling the PNNI/IISP protocols.

At a step S41, the communication-control unit 82 of the signaling-control unit 73 checks whether the main route can be used for communication. Here, the communication-control unit 82 serves as a call-setting check unit capable of handling the PNNI/IISP protocols. If the main route is usable, the procedure goes to a step S42.

At the step S42, connection addresses of the main route are obtained from the routing information of FIG. 13. After the step S42, the procedure goes to a step S45.

At a step S43, which is performed if the step S41 finds that the main route is not usable, a media type of the source terminal is identified, and a current time period is identified based on date and time information.

At a step S44, the IISP-detour-control unit 90 or the PNNI-detour-control unit 94 of the detour-route determining unit 74 obtains connection addresses of the detour route from the IISP-detour-information-storage unit 92 or the PNNI-detour-information-storage unit 96 as shown in FIG. 13 in accordance with the identified media type and the current time period.

At a step S45, the IISP-detour-control unit 90 or the PNNI-detour-control unit 94 of the detour-route determining unit 74 sends a call-setting message by using the connection addresses in compliance with the IISP/PNNI protocols. This ends the procedure.

In the manner described above, when a main route cannot be used for a terminal device, a detour route is selected according to the media type of the terminal device and the current time period.

FIG. 15 is an illustrative drawing showing a fourth embodiment of a detour-information table stored in each of the IISP-detour-information-storage unit 92 and the PNNI-detour-information-storage unit 96.

In FIG. 15, the media type of the CES terminal has a main route that is comprised of the primary relay lines L1 and L3. A detour route of this media type is comprised of the primary relay lines L2 and L4 when the number of calls of this media type is less than a predetermined threshold such as 20 calls, and is comprised of the primary relay line L1 and the external lines L5 and L6 when the number of calls of this media type is no less than the predetermined threshold. Other media types such as FR, ATM, and TDM are also provided with a main route and a detour route that may differ depending on the number of calls.

Figure 16:
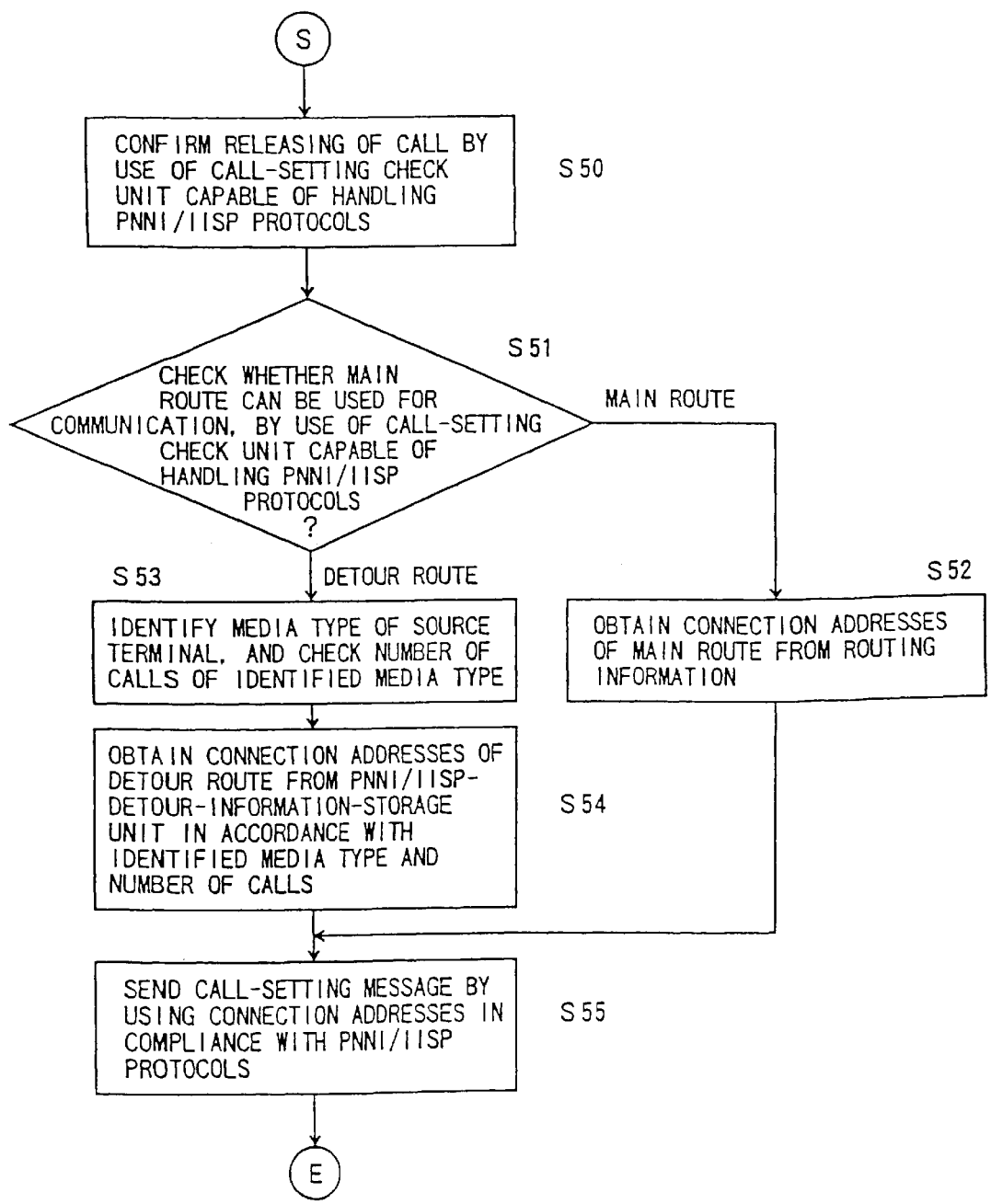
FIG. 16 is a flowchart of a fifth embodiment of a process performed by a communication device connected to a source terminal device when a failure occurs.

FIG. 16 is a flowchart of a fifth embodiment of a process performed by a communication device connected to a source terminal device when a failure occurs.

At a step S50, the line-status-control unit 84 of the signaling-control unit 73 confirms releasing of the call. Here, the line-status-control unit 84 serves as a call-setting check unit capable of handling the PNNI/IISP protocols.

At a step S51, the communication-control unit 82 of the signaling-control unit 73 checks whether the main route can be used for communication. Here, the communication-control unit 82 serves as a call-setting check unit capable of handling the PNNI/IISP protocols. If the main route is usable, the procedure goes to a step S52.

At the step S52, connection addresses of the main route are obtained from the routing information of FIG. 15. After the step S52, the procedure goes to a step S55.

At a step S53, which is performed if the step S51 finds that the main route is not usable, a media type of the source terminal is identified, and the number of calls that relate to the identified media type is checked.

At a step S54, the IISP-detour-control unit 90 or the PNNI-detour-control unit 94 of the detour-route determining unit 74 obtains connection addresses of the detour route from the IISP-detour-information-storage unit 92 or the PNNI-detour-information-storage unit 96 as shown in FIG. 15 in accordance with the identified media type and the number of calls of this media type.

At a step S55, the IISP-detour-control unit 90 or the PNNI-detour-control unit 94 of the detour-route determining unit 74 sends a call-setting message by using the connection addresses in compliance with the IISP/PNNI protocols. This ends the procedure.

In the manner described above, when a main route cannot be used for a terminal device, a detour route is selected according to the media type of the terminal device and the number of calls of this media type. This achieves a cost reduction and an improved efficiency.

Further, the present invention is not limited to these embodiments, but various variations and modifications may be made without departing from the scope of the present invention.

The present application is based on Japanese priority application No. 11-145527 filed on May 25, 1999, with the Japanese Patent Office, the entire contents of which are hereby incorporated by reference.

What is claimed is:

1. A method of controlling detouring in an integrated network which includes communication devices, comprising the steps of:
    a) registering routes at a communication device connected to terminal devices of respective media types such that the routes include a main route and a detour route with respect to each of the media types; and
    b) establishing a connection along the detour route registered for a media type upon finding unavailability of the main route registered for the media type when a call of the media type is requested from one of the terminal devices.

2. The method as claimed in claim 1, wherein said step a) includes steps of:

assigning priority levels to the media types; and registering the routes that include the main route and the detour route with respect to each of the priority levels.

3. The method as claimed in claim 1, wherein said step a) registers the routes such that the routes include the main route and one or more detour routes with respect to each of the media types, and said one or more detour routes are registered with selection information, and said step b) establishes a connection along a selected one of said one or more detour routes registered for the media type by selecting the selected one according to the selection information.

4. The method as claimed in claim 1, wherein said step a) registers the routes such that the routes include the main route and one or more detour routes with respect to each of the media types, and said one or more detour routes are registered with respective timeframes, and said step b) establishes a connection along a selected one of said one or more detour routes registered for the media type by selecting the selected one that has a timeframe corresponding to a current time.

5. The method as claimed in claim 1, wherein said step a) registers the routes such that the routes include the main route and one or more detour routes with respect to each of the media types, and said one or more detour routes are registered with respective ranges of a number of calls, and said step b) establishes a connection along a selected one of said one or more detour routes registered for the media type by selecting the selected one that has a range of a number of calls corresponding to a number of calls currently being made in said media type.

6. A device for communication in an integrated network, connected to terminal devices of respective media types, comprising:

a detour-information-storage unit which stores routes registered therein such that the routes include a main route and a detour route with respect to each of the media types; and a detour-control unit which establishes a connection along the detour route registered for a media type upon finding unavailability of the main route registered for the media type when a call of the media type is requested from one of the terminal devices.

7. The device as claimed in claim 6, wherein the media types have respective priority levels assigned thereto, and said detour-information-storage unit stores the routes registered therein such that the routes include the main route and the detour route with respect to each of the priority levels.

8. The device as claimed in claim 6, wherein said detour-information-storage unit stores the routes registered therein such that the routes include the main route and one or more detour routes with respect to each of the media types, and said one or more detour routes are registered with selection information, and said detour-control unit establishes a connection along a selected one of said one or more detour routes registered for the media type by selecting the selected one according to the selection information.

9. The device as claimed in claim 6, wherein said detour-information-storage unit stores the routes registered therein such that the routes include the main route and one or more detour routes with respect to each of the media types, and said one or more detour routes are registered with respective timeframes, and said detour-control unit establishes a connection along a selected one of said one or more detour routes registered for the media type by selecting the selected one that has a timeframe corresponding to a current time.

10. The device as claimed in claim 6, wherein said detour-information-storage unit stores the routes registered therein such that the routes include the main route and one or more detour routes with respect to each of the media types, and said one or more detour routes are registered with respective ranges of a number of calls, and said detour-control unit establishes a connection along a selected one of said one or more detour routes registered for the media type by selecting the selected one that has a range of a number of calls corresponding to a number of calls currently being made in said media type.

11. The device as claimed in claim 6, wherein said detour-control unit controls the call by using private network-to-network interface (PNNI) protocols.

12. The device as claimed in claim 6, wherein said detour-control unit controls the call by using information infrastructure standards panel (IISP) protocols.

* * * * *